Patented May 30, 1939

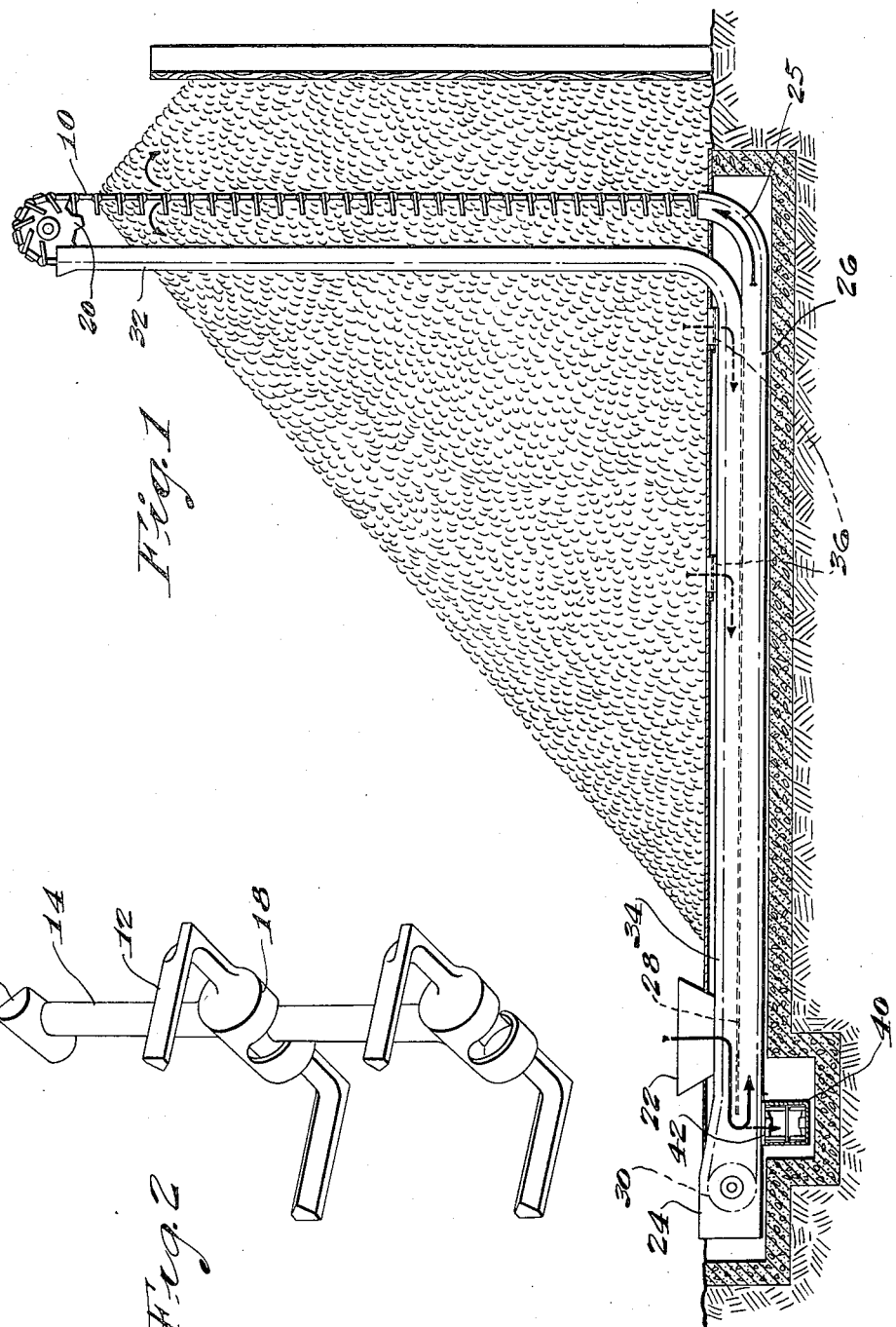

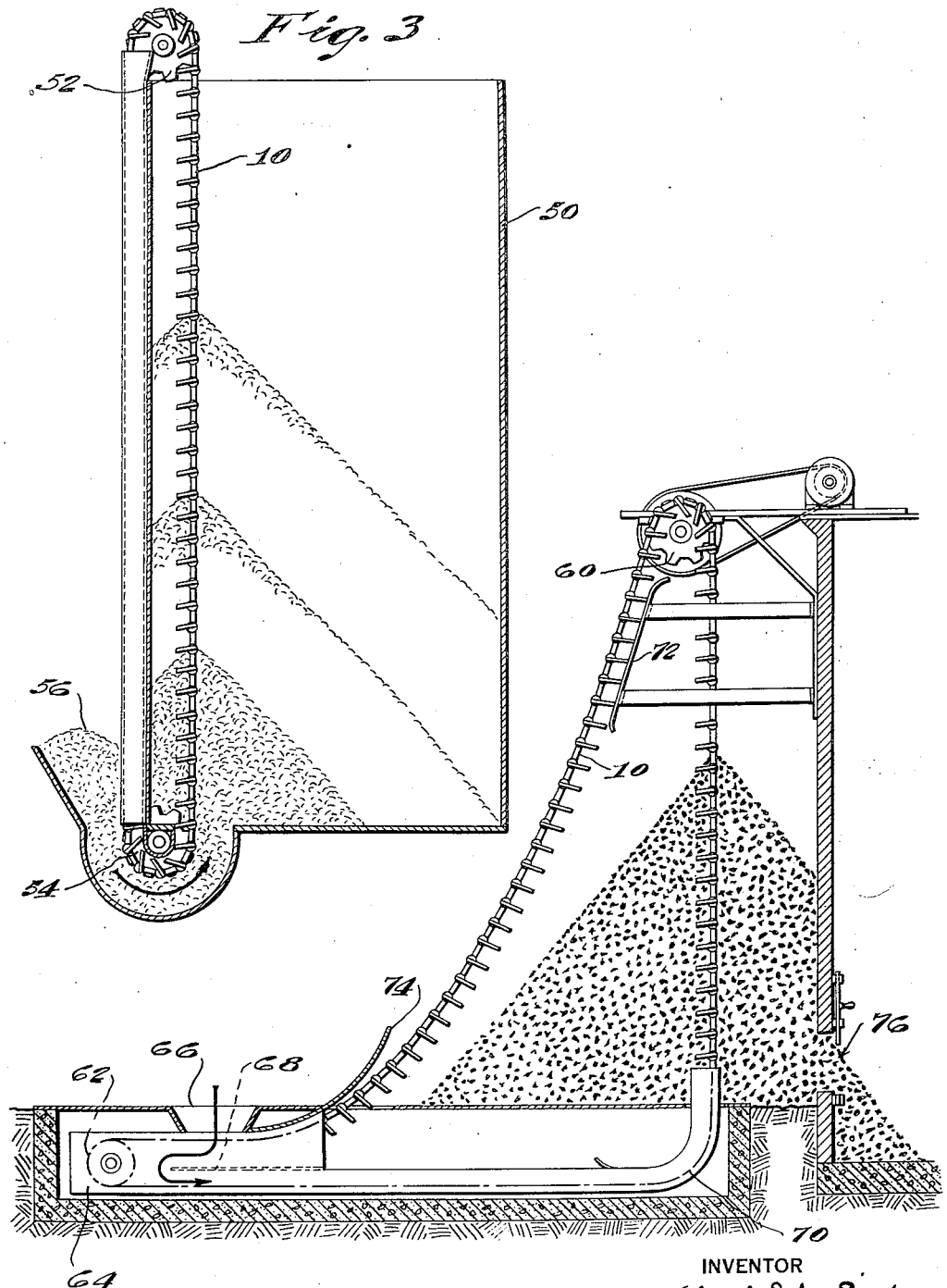

2,160,234

UNITED STATES PATENT OFFICE 2,160,234

CONVEYER

Alfred De Los Sinden, Aurora, Ill., assignor to Redler Conveyor Company, Quincy, Mass., a corporation of Massachusetts Application September 3, 1936, Serial No. 99,181
In Great Britain September 3, 1935

12 Claims. (Cl. 198—168)

This invention relates to a conveyer.

The invention has for an object to provide a novel and highly efficient conveyer which may be economically manufactured and finds particular use among others in building a storage pile of flowable solid material in such manner as to produce minimum dust and breakage in the material being piled and also in reclaiming flowable solid material from a storage pile.

With this general object in view, and such others as may hereinafter appear, the invention consists in the conveyer and in the various structures, arrangements and combinations of parts hereinafter described and particularly defined in the claims at the end of this specification.

In general, the present invention in one of its aspects contemplates a novel, simple and highly efficient conveyer which is capable of use with particular advantage in building a storage pile of flowable solid material and also for reclaiming such material from a storage pile. In another aspect the invention contemplates a novel method of conveying to build a storage pile and to reclaim material from a storage pile.

Referring now to the drawings, which as above stated illustrate different forms of conveyer for use in building a storage pile, Fig. 1 is a vertical sectional view of the present conveyer; Fig. 2 is a perspective of adjacent flight members of which the conveying element is preferably composed; Fig. 3 is a sectional view of a modified form of conveying apparatus embodying the invention; and Fig. 4 is a similar view of still another modified form of the invention.

Referring now to Fig. 1, 10 represents a conveying element comprising a plurality of connected flight members pivotally connected together to form the flexible conveyer. Each flight member is provided with U-shaped arms 12 and a tension member 14 having an enlargement 16 at the end thereof which is adapted to be received within a slotted and hollow hub 18 formed upon the next succeeding flight member, as illustrated in Fig. 2. The conveying element is arranged to be driven by a driving sprocket 20 elevated above the proposed storage pile of material to be formed or built. As illustrative of one embodiment of the invention, the material to be stored may be led to the conveyer through a feed hopper 22 and the conveying element is arranged to run from the source of supply herein indicated as the hopper 22 through a casing 24 connected to the hopper to receive material therefrom, and the casing is preferably arranged to convey the material from the source of supply such as the hopper to a position beneath the head sprocket 20 or to a position within the confines of the proposed storage pile to be built. In the modification illustrated in Fig. 1, the end of the supply leg 26 of the casing is arranged to terminate at substantially the bottom of the proposed pile, and for the remainder of the vertical lift or leg of the conveyer the open or skeleton conveying element is arranged to be drawn upwardly through the air and is not surrounded by a casing. In operation the material being supplied to the hopper 22 falls on an intermediate plate 28, which separates the upper and lower runs of the casing, and the material is conveyed from the plate 28 by the returning flights into the lower conveying leg 26 as indicated by the arrow shown in full lines at the loading point. As herein shown, the endless conveying element 10 is arranged to run over an idler sprocket 30 and as the material is conveyed through the supply leg 26 of the casing it is carried around the bend 25 as illustrated by the arrow and assuming that there is no material as yet stored in the bin, the material will drop off the conveying flights at the point where the casing terminates and will form a pile around the conveying element. As the pile builds up the new material being introduced into the pile is carried through the pile en masse, the surrounding material acting as a four sided conduit, and the material will not leave the conveying flights until the top of the pile is reached. As a result, the solid column of material being elevated through the surrounding pile, is gently discharged at the top of the pile and thus the creation of dust is practically eliminated. The present invention also enables the material to be handled with a minimum of breakage because the material is discharged without any drop, the material simply rolling down the angular sides of the pile.

It will be observed that the elimination of the usual conduit for elevating the material results in practically noiseless operation in addition to the economy effected and simplification of design.

After passing through the pile, the conveying element is guided back to its return run 34 over the driving sprocket 20 and through casing 32. As herein shown, see Fig. 1, the returning flights in the return run 34 may be utilized to reclaim the material from the bottom of the pile through normally closed openings 36 which may be opened manually or otherwise. The material will pass through the openings by gravity into the path of the conveying elements 10 in the upper run 34 as indicated by the dotted arrows and after passing over the end of the plate 28 will be received by a horizontal conveyer 40 through an opening 42 in the bottom of the casing 24. The opening 42, normally closed, may be opened in a manner similar to that described for the openings 36. The horizontal conveyer 40 may comprise any of the well known types of Redler conveyers now on the market and which may be used to convey the reclaimed material away from the pile to its ultimate destination. Obviously the last remaining portions of the pile must be placed over the openings 42 to entirely clear the bin.

In Fig. 3, a modified form of the present invention is illustrated in which the conveying element 10 is shown as applied to a storage bin 50. The conveying element is arranged to run over a driving sprocket 52 and an idler sprocket 54. The storage bin is provided with an inlet 56 through which the material is fed and as the flights pass through the material a pile is formed from the bottom up, in contrast to the usual bin fillers which spill the material down from the top. Greater economy and simplicity is effected through elimination of a casing and discharge spout in the carrying or elevating leg. This application is further characterized by eliminating the necessity of bends in the return run.

Still another modification, see Fig. 4, illustrates the adaptability of the present invention. In this application the conveying element 10 is arranged to run over a driving sprocket 60, an idler sprocket 62 and through a casing 64. The material may be fed through an inlet 66 and onto a plate 68 from which the material is swept onto the lower run of the casing 64 by the returning flights. The material is conveyed along the lower run around a bend 70 where the casing terminates and in a manner similar to the previous applications, the open flights form a pile of the material. Guides 72 and 74 are provided for the return run. An opening 76 in the wall adjacent the pile is shown as one means of delivering the material from the pile. This modification is characterized by the minimum amount of casing necessary and by the elimination of a return run for the conveying element. The casing 64 may be U-shaped without any top covering along the horizontal run and in some cases the casing may be eliminated along the horizontal run, provided a guide is used at the bend 70.

While in the preferred embodiment of the invention it is preferred to utilize a conveying element having flights of skeleton or open formation, it will be understood that it is not desired to limit the invention in this respect as other forms of conveying elements may be used if desired.

While the preferred embodiment of the invention has been illustrated and described it will be understood that the invention may be embodied in other forms within the scope of the following claims.

Having thus described the invention, what is claimed is:

1. A conveyer for piling material, comprising a first conduit forming the carrying run of the conveyer, a second conduit forming the return run of the conveyer, and a conveying element for conveying a flowable solid material through said conduits, said first conduit having a discharge end terminating on substantially the same level as the surface upon which a pile is to be formed, whereby material discharged from said first conduit forms a pile through which said conveying element must pass.

2. The combination with a casing including a substantially vertical portion, said casing being open at both ends, of an endless open flight conveyer passing through the casing and extending to a point substantially beyond the discharge end thereof, the discharge end of said casing terminating on substantially the same level as the surface upon which a pile is to be formed, said conveyer being operable to convey flowable solid material upwardly through said vertical portion of said casing in a continuous stream, so that, as the conveyed material emerges from the upper end of said casing it is automatically discharged and forms a pile surrounding said open flight conveyer, the height of said pile progressively increasing as more material is conveyed through the casing.

3. The combination with an endless conveyer of a conduit having a substantially vertical portion through which the conveyer passes for a portion of its length to convey flowable solid material therethrough, a portion of the conveyer extending vertically above the discharge end of the conduit, said discharge end of said conduit terminating on substantially the same level as the surface upon which a pile is to be formed, so that, as the material is conveyed through the conduit and discharged from the conveyer, a pile of progressively increasing height is automatically formed around the conveyer.

4. The method of piling dust forming material without the creation of any substantial amount of dust which comprises the steps of: conveying material from a source of supply to a place where a pile thereof is to be formed, discharging said material to form a pile, conveying material upwardly so that it passes through said pile, and then gently discharging said material at the top of said pile to thereby progressively increase the height of said pile.

5. The method of piling material, which comprises the steps of: conveying fragile material from a source of supply to a place where a pile thereof is to be formed, discharging said material to form a pile, conveying material upwardly so that it passes through said pile, and then gently discharging said material at the top of said pile to effect a minimum of breakage and to progressively increase the height of said pile.

6. An apparatus for piling and unpiling material, comprising, a first conduit normally forming a carrying or supply casing, a second conduit normally forming a return casing, a hopper for admitting material to be conveyed into said return casing adjacent one end thereof, an endless conveyer passing through both of said casings, said supply casing being so arranged relatively to said return casing that material discharged from said supply casing forms a pile overlying at least a portion of said return casing, the path of travel of said conveyer being such that it must pass through said pile and discharge the material at the top of said pile as said pile is progressively formed, and means separate from said hopper for admitting material from said pile into said return casing to thereby convert the same into a supply casing, whereby material from said pile may be reclaimed.

7. Apparatus for piling flowable solid material, comprising, an endless conveyer, a return casing, a supply casing, said supply casing having an arcuate portion at one end thereof, said return casing having one end thereof offset and terminating in vertically spaced relation to said arcuate portion of said supply casing, and a sprocket at the upper end of said return casing, said conveyer passing through both of said casings and over said sprocket, the portion of said conveyer between said sprocket and said arcuate portion of said supply casing being unenclosed and capable of discharging material at progressively increasing heights.

8. Apparatus for piling flowable solid material, comprising, an endless conveyer, a return casing, a supply casing, said supply casing terminating at one end in a portion curved through an arc of about 90°, said return casing having one end thereof terminating in vertically spaced relation to said curved end of said supply casing, and a sprocket at the upper end of said return casing, said conveyer passing through both of said casings and over said sprocket, the portion of said conveyer between said sprocket and said curved end of said supply casing being unenclosed and capable of discharging material at progressively changing heights.

9. Apparatus for piling flowable sold material, comprising, an endless open flight conveyer, a return casing, a supply casing, said return casing including a substantially vertical leg portion, said supply casing terminating at one end in a portion curved through an arc of about 90°, said return casing having the vertical leg thereof offset and terminating in vertically spaced relation to said curved end of said supply casing, and a sprocket at the upper end of said return casing, said conveyer passing through both of said casings and over said sprocket, the portion of said conveyer between said sprocket and said curved end of said supply casing being substantially vertical and unenclosed and capable of discharging material at progressively changing heights.

10. Apparatus for piling flowable solid material, comprising, an endless conveyer, a substantially vertical return casing, and sprocket wheels arranged at the upper and lower ends of said casing, respectively, said conveyer passing through said return casing and over said sprocket wheels, said conveyer having an unenclosed portion between said sprocket wheels extending substantially parallel to said casing, the unenclosed portion of said conveyer being capable of discharging material at progressively changing heights.

11. In combination, a storage bin having an inlet, and an apparatus for piling flowable material, said apparatus comprising an endless conveyer, a substantially vertical return casing, and sprocket wheels arranged at the upper and lower ends of said casing, respectively, the lower end of said return casing and one of said sprockets being arranged in said inlet, said conveyer passing through said return casing and over said sprocket wheels and having an unenclosed portion capable of discharging material at progressively changing heights between said sprocket wheels, said unenclosed portion of said conveyer extending substantially parallel to said casing.

12. Apparatus for piling flowable solid material comprising, an endless conveyer, a supply casing, said casing terminating at one end in an arcuate portion, a sprocket supported a substantial distance above said arcuate portion, said conveyer passing through said supply casing and over said sprocket, the portion of said conveyer between said arcuate portion of said casing and said sprocket being unenclosed and capable of discharging material at progressively varying heights.

ALFRED DE LOS SINDEN.